US009530411B2

United States Patent
Agapi et al.

(10) Patent No.: US 9,530,411 B2
(45) Date of Patent: *Dec. 27, 2016

(54) DYNAMICALLY EXTENDING THE SPEECH PROMPTS OF A MULTIMODAL APPLICATION

(71) Applicant: Nuance Communications, Inc., Burlington, MA (US)

(72) Inventors: Ciprian Agapi, Lake Worth, FL (US); William K. Bodin, Austin, TX (US); Charles W. Cross, Jr., Wellington, FL (US)

(73) Assignee: Nuance Communications, Inc., Burlington, MA (US)

(*) Notice: Subject to any disclaimer, the term of this patent is extended or adjusted under 35 U.S.C. 154(b) by 376 days.

This patent is subject to a terminal disclaimer.

(21) Appl. No.: 14/010,265

(22) Filed: Aug. 26, 2013

(65) Prior Publication Data

US 2013/0339033 A1 Dec. 19, 2013

Related U.S. Application Data

(63) Continuation of application No. 13/612,014, filed on Sep. 12, 2012, now Pat. No. 8,521,534, and a
(Continued)

(51) Int. Cl.
*G10L 15/00* (2013.01)
*G10L 15/22* (2006.01)
(Continued)

(52) U.S. Cl.
CPC .......... *G10L 15/22* (2013.01); *H04M 3/42204* (2013.01); *G10L 13/00* (2013.01); *H04M 2201/40* (2013.01)

(58) Field of Classification Search
CPC ................ G10L 15/265; G06F 17/3074; G06F 17/30743
(Continued)

(56) References Cited

U.S. PATENT DOCUMENTS 5,071,485 A 12/1991 Matthews et al.
5,577,165 A 11/1996 Takebayashi et al.
(Continued)

FOREIGN PATENT DOCUMENTS

CN 1385783 12/2002
EP 0794670 9/1997
(Continued)

OTHER PUBLICATIONS

International Preliminary Report on Patentability and Written Opinion of the International Searching Authority in PCT Application No. EP2008/051358 dated Aug. 26, 2009 (13 pages).
(Continued)

*Primary Examiner* — Daniel Abebe
(74) *Attorney, Agent, or Firm* — Holland & Knight LLP; Mark H. Whittenberger, Esq.

(57) ABSTRACT

A prompt generation engine operates to dynamically extend prompts of a multimodal application. The prompt generation engine receives a media file having a metadata container. The prompt generation engine operates on a multimodal device that supports a voice mode and a non-voice mode for interacting with the multimodal device. The prompt generation engine retrieves from the metadata container a speech prompt related to content stored in the media file for inclusion in the multimodal application. The prompt generation engine modifies the multimodal application to include the speech prompt.

14 Claims, 8 Drawing Sheets

Related U.S. Application Data continuation of application No. 12/490,443, filed on Jun. 24, 2009, now Pat. No. 8,290,780.

(51) Int. Cl.
  *H04M 3/42* (2006.01)
  *G10L 13/00* (2006.01)

(58) Field of Classification Search
  USPC .......................................................... 704/275
  See application file for complete search history.

(56) References Cited

U.S. PATENT DOCUMENTS

| | | | |
|---|---|---|---|
| 5,584,052 | A | 12/1996 | Gulau et al. |
| 5,899,972 | A | 5/1999 | Miyazawa et al. |
| 6,208,972 | B1 | 3/2001 | Grant et al. |
| 6,269,336 | B1 | 7/2001 | Ladd et al. |
| 6,314,402 | B1 | 11/2001 | Monaco et al. |
| 6,606,599 | B2 | 8/2003 | Grant et al. |
| 6,856,960 | B1 | 2/2005 | Dragosh et al. |
| 6,920,425 | B1 | 7/2005 | Will et al. |
| 6,999,930 | B1 | 2/2006 | Roberts et al. |
| 7,035,805 | B1 | 4/2006 | Miller |
| 7,171,243 | B2 | 1/2007 | Watanabe et al. |
| 7,188,067 | B2 | 3/2007 | Grant et al. |
| 7,647,227 | B1 | 1/2010 | Khosla |
| 8,046,227 | B2 | 10/2011 | Starkie |
| 8,290,780 | B2 | 10/2012 | Agapi |
| 8,438,485 | B2* | 5/2013 | Kulis ................... G06F 3/167 704/270.1 |
| 8,521,534 | B2 | 8/2013 | Agapi |
| 8,577,856 | B2* | 11/2013 | Mizrahi ...................... 707/705 |
| 2002/0065944 | A1 | 5/2002 | Hickey et al. |
| 2002/0099553 | A1 | 7/2002 | Brittan et al. |
| 2002/0120554 | A1 | 8/2002 | Vega |
| 2002/0147593 | A1 | 10/2002 | Lewis et al. |
| 2002/0184610 | A1 | 12/2002 | Chong |
| 2003/0039341 | A1 | 2/2003 | Burg et al. |
| 2003/0046316 | A1 | 3/2003 | Gergic et al. |
| 2003/0046346 | A1 | 3/2003 | Mumick et al. |
| 2003/0101451 | A1 | 5/2003 | Bentolila et al. |
| 2003/0125945 | A1 | 7/2003 | Doyle |
| 2003/0130849 | A1 | 7/2003 | Durston et al. |
| 2003/0179865 | A1 | 9/2003 | Stillman et al. |
| 2003/0182622 | A1 | 9/2003 | Sibal et al. |
| 2003/0195739 | A1 | 10/2003 | Washio |
| 2003/0217161 | A1 | 11/2003 | Balasuriya |
| 2003/0229900 | A1 | 12/2003 | Reisman |
| 2003/0235282 | A1 | 12/2003 | Sichelman et al. |
| 2004/0025115 | A1 | 2/2004 | Sienel et al. |
| 2004/0031058 | A1 | 2/2004 | Reisman |
| 2004/0049390 | A1 | 3/2004 | Brittan et al. |
| 2004/0054541 | A1* | 3/2004 | Kryze et al. ................... 704/275 |
| 2004/0059705 | A1 | 3/2004 | Wittke et al. |
| 2004/0083109 | A1 | 4/2004 | Halonen et al. |
| 2004/0120472 | A1 | 6/2004 | Popay et al. |
| 2004/0120476 | A1 | 6/2004 | Harrison et al. |
| 2004/0138890 | A1 | 7/2004 | Ferrans et al. |
| 2004/0153323 | A1 | 8/2004 | Charney et al. |
| 2004/0216036 | A1 | 10/2004 | Chu et al. |
| 2004/0236574 | A1 | 11/2004 | Ativanichayaphong et al. |
| 2004/0260562 | A1 | 12/2004 | Kujirai |
| 2005/0013864 | A1 | 1/2005 | Shimura et al. |
| 2005/0075884 | A1 | 4/2005 | Badt, Jr. |
| 2005/0091059 | A1 | 4/2005 | Lecoeuche |
| 2005/0131701 | A1 | 6/2005 | Cross et al. |
| 2005/0138219 | A1 | 6/2005 | Boughannam et al. |
| 2005/0138647 | A1 | 6/2005 | Boughannam |
| 2005/0154580 | A1 | 7/2005 | Horowitz et al. |
| 2005/0160461 | A1 | 7/2005 | Baumgartner et al. |
| 2005/0188412 | A1 | 8/2005 | Dacosta |
| 2005/0203729 | A1 | 9/2005 | Roth et al. |
| 2005/0203747 | A1 | 9/2005 | Lecoeuche |
| 2005/0261908 | A1 | 11/2005 | Cross, Jr. et al. |
| 2005/0283367 | A1 | 12/2005 | Ativanichayaphong et al. |
| 2006/0047510 | A1 | 3/2006 | Ativanichayaphong et al. |
| 2006/0064302 | A1 | 3/2006 | Ativanichayaphong et al. |
| 2006/0069564 | A1 | 3/2006 | Allison et al. |
| 2006/0074680 | A1 | 4/2006 | Cross, Jr. et al. |
| 2006/0111906 | A1 | 5/2006 | Cross et al. |
| 2006/0122836 | A1 | 6/2006 | Cross, Jr. et al. |
| 2006/0123358 | A1 | 6/2006 | Lee et al. |
| 2006/0136222 | A1 | 6/2006 | Cross et al. |
| 2006/0146728 | A1 | 7/2006 | Engelsma et al. |
| 2006/0168095 | A1 | 7/2006 | Sharma et al. |
| 2006/0184626 | A1 | 8/2006 | Agapi et al. |
| 2006/0190264 | A1 | 8/2006 | Jaramillo et al. |
| 2006/0218039 | A1 | 9/2006 | Johnson |
| 2006/0224430 | A1 | 10/2006 | Butt |
| 2006/0229880 | A1 | 10/2006 | White et al. |
| 2006/0235694 | A1 | 10/2006 | Cross et al. |
| 2007/0288237 | A1* | 12/2007 | Wu et al. ...................... 704/235 |
| 2008/0140385 | A1* | 6/2008 | Mahajan et al. ................... 704/9 |
| 2008/0177611 | A1 | 7/2008 | Sommers et al. |
| 2009/0094233 | A1 | 4/2009 | Marvit et al. |
| 2009/0144428 | A1 | 6/2009 | Bowater et al. |
| 2009/0204465 | A1 | 8/2009 | Pradhan |
| 2009/0234921 | A1 | 9/2009 | Dudley |
| 2009/0287685 | A1 | 11/2009 | Charnock et al. |
| 2010/0114574 | A1* | 5/2010 | Liu et al. ...................... 704/251 |
| 2010/0241963 | A1* | 9/2010 | Kulis ..................... G06F 3/167 715/727 |
| 2010/0332234 | A1 | 12/2010 | Agapi |
| 2013/0018658 | A1 | 1/2013 | Agapi |
| 2014/0026046 | A1* | 1/2014 | Born ..................... G06F 3/0482 715/716 |

FOREIGN PATENT DOCUMENTS

| | | |
|---|---|---|
| EP | 1450350 | 8/2004 |
| JP | 2000155529 A | 6/2000 |
| JP | 02003140672 A | 5/2003 |
| WO | 0051106 | 8/2000 |
| WO | 0232140 | 4/2002 |
| WO | 2004062945 A | 7/2004 |
| WO | 2006108795 | 10/2006 |

OTHER PUBLICATIONS

International Search Report and Written Opinion of the International Searching Authority in PCT Application No. EP2008/051363 dated Jun. 18, 2008 (11 pages).

Final Office Action in U.S. Appl. No. 11/154,896 dated May 14, 2008 (11 pages).

Final Office Action in U.S. Appl. No. 11/154,899 dated Jun. 23, 2009 (13 pages).

Non-Final Office Action in U.S. Appl. No. 12/109,227 mailed Dec. 10, 2010 (27 pages).

W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL: http://www.w3.org/TR/2005/CR-voicexml21-20050613/ [retrieved on Nov. 11, 2015 (26 pages).

W3C: "Voice Extensible Markup Language (VoiceXML) Version 2.0" Internet Citation, [Online] XP002248286 Retrieved from the Internet: URL: http://www.w3.org/TR/voicexml20 [retrieved on Jul. 1, 2015] (150 pages).

Axelsson et al., "XHTML + Voice Profile 1.2" Internet, [Online] Mar. 16, 2004 (Mar. 6, 2004), pp. 1-53, XP002484188 Retrieved from the Internet: URL: http://www.voicexml.org/specs/multimodal/x+v/12/spec.html [retrieved on Jun. 12, 2008] [Reference not included—cited in U.S. Appl. No. 12/490,443].

Didier Guillevic et al., Robust Semantic Confidence Scoring ICSLP 2002: 7th International Conference on Spoken Language Processing. Denver Colorado, Sep. 16-20, 2002 International Conference on Spoken Language Processing (ICSLP), Adelaide: Causal Productions, AI, Sep. 16, 2002 (Sep. 16, 2002), p. 853, XP007011561 ISBN: 9788-1-876346-40-9 (4 pages) [Reference not included—cited in U.S. Appl. No. 12/490,443].

(56) References Cited

OTHER PUBLICATIONS

Non-Final Office Action in U.S. Appl. No. 13/612,014 mailed Dec. 18, 2012 (19 pages).
Notice of Allowance in U.S. Appl. No. 13/612,014 mailed Apr. 26, 2013 (6 pages).
Notice of Allowance in U.S. Appl. No. 12/490,443 mailed Jun. 11, 2012 (9 pages).
Supplemental Notice of Allowability in U.S. Appl. No. 12/490,443 mailed Aug. 3, 2012 (4 pages).

* cited by examiner

DYNAMICALLY EXTENDING THE SPEECH PROMPTS OF A MULTIMODAL APPLICATION

RELATED APPLICATIONS

This application claims the benefit under 35 U.S.C. §120 of U.S. patent application Ser. No. 13/612,014, filed on Sep. 12, 2012, and U.S. patent application Ser. No. 12/490,443, filed Jun. 24, 2009, now U.S. Pat. No. 8,290,780, issued Oct. 16, 2012, the entire contents of which are incorporated herein by reference.

BACKGROUND

Embodiments of the inventive subject matter generally relate to the field of data processing, or, more specifically, dynamically extending the speech prompt of a multimodal application.

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browser. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT application and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and XML. Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with Java speech framework, in C++, for example, and with other technologies and in other environments as well.

Currently multimodal application may be used to drive the execution of media content. Often the capability of a multimodal application to drive the execution of media content using speech is limited because artists use many different names over the course of a career, have difficult names to pronounce, have song titles that are difficult to pronounce, or any other reason that the grammar or lexicons of a speech engine do not include grammar rules or pronunciation rules specific to the content of a media file. Furthermore, often multimodal applications developed without consideration to specific media content are not capable of multimodal interaction with a user with speech prompts specific to that media content.

SUMMARY

Embodiments of the inventive subject matter include a method of dynamically extending the speech prompts of a multimodal application. A prompt generation engine receives a media file having a metadata container. The prompt generation engine operates on a multimodal device that supports a voice mode and a non-voice mode for interacting with the multimodal device. The prompt generation engine retrieves from the metadata container a speech prompt related to content stored in the media file for inclusion in the multimodal application. The prompt generation engine modifies the multimodal application to include the speech prompt.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Figure 1:
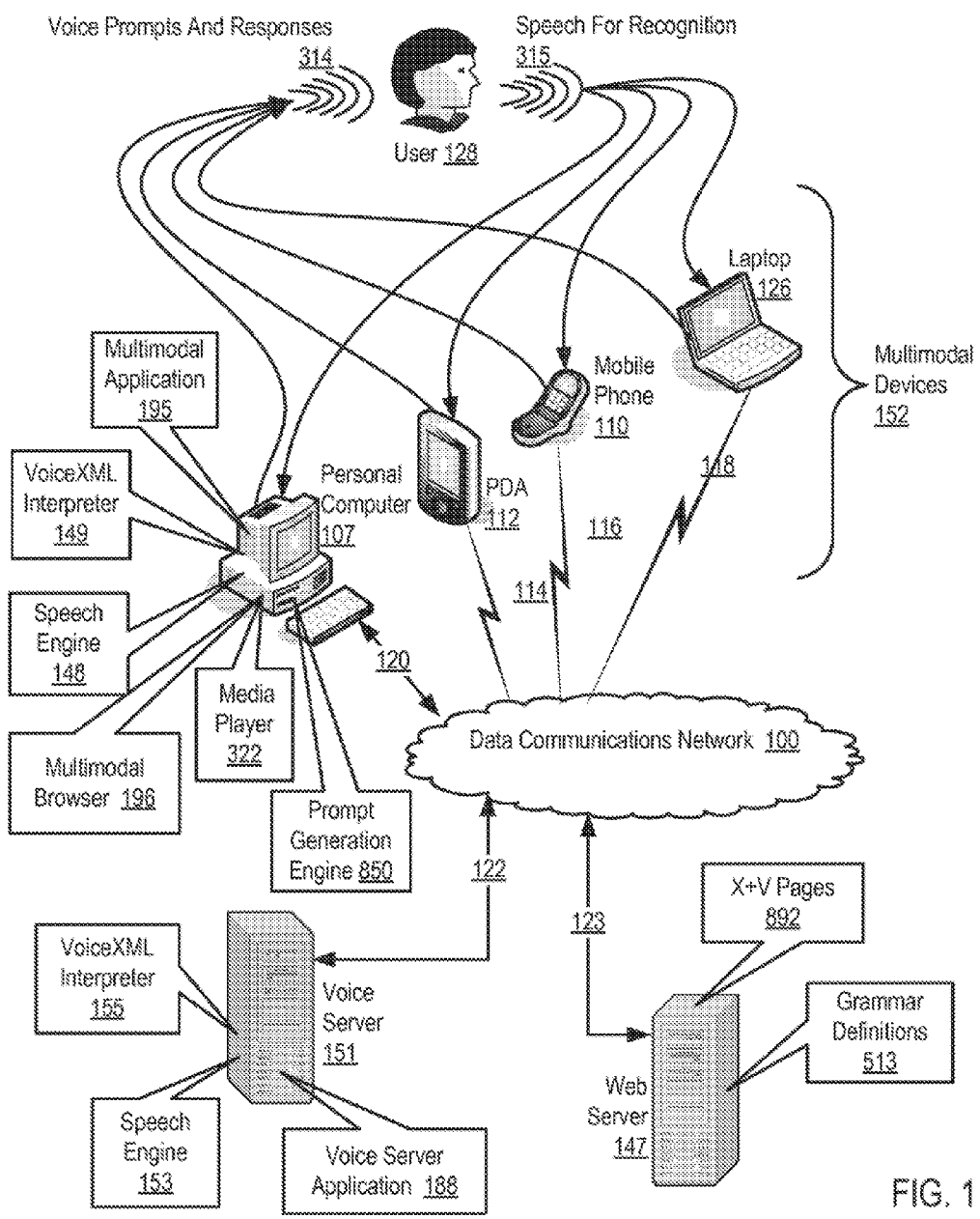
FIG. 1 sets forth a network diagram illustrating an exemplary system for improving speech capabilities of a multimodal application in a multimodal application according to embodiments of the present inventive subject matter FIG. 2 sets forth a block diagram of automated computing machinery comprising an example of a computer useful as a voice server in improving speech capabilities of a multimodal application according to embodiments of the present inventive subject matter.

Example methods, apparatus, and products for dynamically extending the speech prompts of a multimodal application are described with reference to the accompanying drawings, beginning with FIG. 1. FIG. 1 sets forth a network diagram illustrating an exemplary system for dynamically extending the speech prompts of a multimodal application according to embodiments of the present inventive subject matter. Dynamically extending the speech prompts of a multimodal application in the example is implemented with a multimodal browser (196) that supports a prompt generation engine (850) and a media player (322). The multimodal browser supports a speech engine (148) operating on a multimodal device (152) or a speech engine (153) residing on a voice server (151). The system of FIG. 1 includes at least one speech recognition grammar (104) that specifies words and phrases to be recognized by an automatic speech recognition ('ASR') engine (150) of a speech engine (148, 20 153). The multimodal device (152) supports multiple modes of user interaction with the multimodal application including a voice mode and one or more non-voice modes of user interaction with the multimodal application. The voice mode is represented here with audio output of voice prompts and response (177) form the multimodal devices and audio input of speech for recognition (315) from a user (128). Non-voice modes are represented by input/output devices such as keyboards and display screens on the multimodal devices (152). The multimodal application is operatively coupled (195) to an ASR engine (150) in a speech engine (148). The operative coupling may be implemented with an application programming interface ('API'), a voice service module, or a VOIP connection as explained more detail below.

The system of FIG. 1 operates generally to carry out improving speech capabilities of a multimodal application by receiving, by the multimodal browser (196), a media file (324) having a metadata container, retrieving, by the multimodal browser (196), from the metadata container of the media file (324) a speech artifact related to content stored in the media file (324) for inclusion in the speech engine (153) available to the multimodal browser (196); and determining whether the speech artifact (508) includes a grammar rule or a pronunciation role. If the speech artifact includes a grammar rule, improving speech capabilities of a multimodal application according to the example of FIG. 1 includes modifying, by the multimodal browser (196), the grammar of the speech engine (148 or 153) to include the grammar rule. If the speech artifact includes a pronunciation rule, improving speech capabilities of a multimodal application according to the example of FIG. 1 includes modifying, by the multimodal browser (196), the lexicon of the speech engine (133) to include the pronunciation rule.

A speech artifact is one or more individual speech rules for inclusion in either a grammar or lexicon available to a speech engine used by a multimodal browser for use in executing a multimodal application. Such speech artifacts are often embodied in an XML document. The artifact may be extracted from the XML document and included in a larger grammar defining the words understood by the speech recognition engine or in a lexicon defining the manner in which the words so recognized are pronounced.

The prompt generation engine of FIG. 1 is a module of automated computing machinery for dynamically extending the speech prompts of a multimodal application according to embodiments of the present inventive subject matter. The prompt generation engine of FIG. 1 operates generally to carry out dynamically extending the speech prompts of a multimodal application by receiving, by the prompt generation engine (850), a media file having a metadata container; retrieving, by the prompt generation engine from the metadata container, a speech prompt related to content stored in the media file for inclusion in the multimodal application (195); and modifying, by the prompt generation engine (850), the multimodal application (195) to include the speech prompt.

A multimodal device is an automated device, that is, automated computing machinery or a computer program running on an automated device, that is capable of accepting from user more than one mode of input, keyboard, mouse, stylus, and so on, including speech input—and also displaying more than one mode of output, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, this specification uses the term 'multimodal application' to refer to any software application, server-oriented or client-oriented, thin client or thick client, that administers more than one mode of input and more than one mode of output, typically including visual and speech modes.

The system of FIG. 1 includes several example multimodal devices:

personal computer (107) which is coupled for data communications to data communications network (100) through wireline connection (120), personal digital assistant ('PDA') (112) which is coupled for data communications to data communications network (100) through wireless connection (114), mobile telephone (110) which is coupled for data communications to data communications network (100) through wireless connection (116), and laptop computer (126) which is coupled for data communications to data communications network (100) through wireless connection (118).

Each of the example multimodal devices (152) in the system of FIG. 1 includes a microphone, an audio amplifier, a digital-to-analog converter, a multimodal browser, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled RTP Payload Format for European Telecommunications Standards Institute (ETSI) European Standard ES 201 108 Distributed Speech Recognition Encoding and the Internet Draft entitled RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present inventive subject matter regarding codecs, payload formats, or packet structures. Multimodal applications according to embodiments of the present inventive subject matter may implement any codec, including, for example:

AMR (Adaptive Multi-Rate Speech coder)
ARDOR (Adaptive Rate-Distortion Optimized sound codeR),
Dolby Digital (A/52, AC3).
DTS (DTS Coherent Acoustics),
MP1 (MPEG audio layer-1),
MP2 (MPEG audio layer-2) Layer 2 audio codec (MPEG-1, MPEG-2 and non-ISO MPEG-2.5),
MP3 (MPEG audio layer-3) Layer 3 audio codec (MPEG-1, MPEG-2 and non-ISO MPEG-2.5),
Perceptual Audio Coding,
FS-1015 (LPC-10),
FS-1016 (CELP),
G.726 (ADPCM),
G.728 (LD-CELP),
G.729 (CS-ACELP),
GSM,
HILN (MPEG-4 Parametric audio coding), and
others as may occur to those of skill in the art.

As mentioned, a multimodal device according to embodiments of the present inventive subject matter is capable of providing speech to a speech engine for recognition. A speech engine is a functional module, typically a software module, although it may include specialized hardware also, that does the work of recognizing and generating or 'synthesizing' human speech. The speech engine implements speech recognition by use of a further module referred to in this specification as a ASR engine, and the speech engine carries out speech synthesis by use of a further module referred to in this specification as a text-to-speech ('TTS') engine. As shown in FIG. 1, a speech engine (148) may be installed locally in the multimodal device (107) itself, or a speech engine (153) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with not need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal application software that obtains speech recognition and speech synthesis services from a voice server located remotely across a network from the thin client. For ease of explanation, only one (107) of the multimodal devices (152) in the system of FIG. 1 is shown with a speech engine (148), but readers will recognize that any multimodal device may have a speech engine according to embodiments of the present inventive subject matter.

A multimodal application (195) in this example runs in a multimodal browser (196). The multimodal client application (195) may be a set or sequence of X+V or SALT documents that execute on the multimodal browser (196). The multimodal browser (196) of FIG. 1 supports the execution of a media player (322) through voice modes and non-voice modes. A media player is automated computing machinery for managing and administering media content in media files such as audio files and video files. Examples of media players that may be modified for use in accordance with the present inventive subject matter include Music Match™, iTunes®, Songbird™, and others as will occur to those of skill in the art.

A multimodal application (195) in this example running in a multimodal browser (196) provides speech for recognition and text for speech synthesis to a speech engine through a VoiceXML interpreter (149, 155). A VoiceXML interpreter is a software module of computer program instructions that accepts voice dialog instructions from a multimodal application, typically in the form of a VoiceXML <form> element. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA').

A Form Interpretation Algorithm ('FIA') drives the interaction between the user and a multimodal application. The FIA is generally responsible for selecting and playing one or more speech prompts, collecting a user input, either a response that fills in one or more input items, or a throwing of some event, and interpreting actions that pertained to the newly filled in input items. The FIA also handles multimodal application initialization, grammar activation and deactivation, entering and leaving forms with matching utterances and many other task. The FIA also maintains an internal prompt counter that is increased with each attempt to provoke a response from a user. That is, with each failed attempt to prompt a matching speech response from a user an internal prompt counter is incremented.

As shown in FIG. 1, a VoiceXML interpreter (149) may be installed locally in the multimodal device (107) itself, or a VoiceXML interpreter (166) may be installed remotely with respect to the multimodal device, across a data communications network (100) in a voice server (151). In a thick client architecture, a multimodal device (152) includes both its own speech engine (148) and its own VoiceXML interpreter (149). The VoiceXML interpreter (149) exposes an API to the multimodal application (195) for use in providing speech recognition and speech synthesis for the multimodal application. The multimodal application provides dialog instructions, VoiceXML <form> elements, grammars, input elements, event handlers, and so on, through the API to the VoiceXML interpreter, and the VoiceXML interpreter administers the speech engine on behalf of the multimodal application. In the thick client architecture, VoiceXML dialogs are interpreted by a VoiceXML interpreter on the multimodal device. In the thin client architecture, VoiceXML dialogs are interpreted by a VoiceXML interpreter on a voice server (151) located remotely across a data communications network (100) from the multimodal device running the multimodal application (195).

The VoiceXML interpreter provides grammars, speech for recognition, and text prompts for speech synthesis to the speech engine, and the VoiceXML interpreter returns to the multimodal application speech engine output in the form of recognized speech, semantic interpretation results, and digitized speech for voice prompts. In a thin client architecture, the VoiceXML interpreter (155) is located remotely from the multimodal client device in a voice server (151), the API for the VoiceXML interpreter is still implemented in the multimodal device, with the API modified to communicate voice dialog instructions, speech for recognition, and text and voice prompts to and from the VoiceXML interpreter on the voice server. For ease of explanation, only one (107) of the multimodal devices (152) in the system of FIG. 1 is shown with a VoiceXML interpreter (149), but readers will recognize that any multimodal device may have a VoiceXML interpreter according to embodiments of the present inventive subject matter. Each of the example multimodal devices (152) in the system of FIG. 1 may be configured to carry out improving speech capabilities of a multimodal application and dynamically extending the speech prompts of a multimodal application according to the present inventive subject matter. The use of these four example multimodal devices (152) is for explanations only, not for limitation of the inventive subject matter. Any automated computing machinery capable of accepting speech from a user, providing the speech digitized to an ASR engine through a VoiceXML interpreter, and receiving an playing speech prompts and responses from the VoiceXML interpreter may be improved to function as a multimodal device for improving speech capabilities of a multimodal application according to the present inventive subject matter.

The system of FIG. 1 also includes a voice server (151) which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal device (152) and the voice server (151) for data communications. A data communications network useful for improving speech capabilities of a multimodal application and dynamically extending the speech prompts of a multimodal application according to embodiments of the present inventive subject matter is a data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet™ Protocol or the Wireless Ethernet™ Protocol,
   a data communications network layer with the Internet Protocol ('IP'),
   a transport layer with the Transmission Control Protocol ('TCP') or the User Datagram Protocol ('UDP'),
   an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
   other protocols as will occur to those of skill in the art.

The system of FIG. 1 includes a web server (147) connected for data communications through wireline connection (123) to network (100) and therefore to the multimodal devices (152). The web server (147) may be any server that provides to client devices markup document (892) that compose multimodal applications. The web server (147) typically provides such markup documents via a data communications protocol, HTTP, HDTP, WAP, or the like. That is, although the term 'web' is used to describe the web server generally in this specification, there is no limitation of data communications between multimodal devices and the web server to HTTP alone. The markup documents also may be implemented in any markup language that supports non-speech display elements, data entry elements, and speech elements for identifying which speech to recognize and which words to speak, grammars, form elements, and the like, including, for example, X+V and SALT. A multimodal application in a multimodal device then, upon receiving from the web server (147) a markup document as part of a multimodal application, may execute speech elements by use of a VoiceXML interpreter (149) and speech engine (148) in the multimodal device itself or by use of a VoiceXML interpreter (155) and speech engine (153) located remotely from the multimodal device in a voice server (151).

The arrangement of the multimodal device (152), the web server (147), the voice server (151), and the data communications network (100) making up the exemplary system illustrated in FIG. 1 are for explanation, not for limitation. Data processing systems useful for improving speech capabilities of a multimodal application according to the present inventive subject matter may include additional severs, routers, other devices, and peer-to-peer architectures, not shown in FIG. 1, as will occur to those of skill in the art. Data communications networks in suck data processing systems may support many data communications protocols in addition to those noted above. Various embodiments of the present inventive subject matter may be implemented on a variety of hardware platforms in addition to those illustrated in FIG. 1.

Improving speech capabilities of a multimodal application and dynamically extending the speech prompts of a multimodal application according to embodiments of the present inventive subject matter in a thin client architecture may be implemented with one ore more voice servers, computers, that is, automated computing machinery, that provide speech recognition and speech synthesis. For further explanation, therefore, FIG. 2 sets forth a block diagram of automated computing machinery comprising an example of a computer useful as a voice server (151). The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a voice server application (188), a module of computer program instructions capable of operating a voice server in a system that is configured for use in improving speech capabilities of a multimodal application and dynamically extending the speech prompts of a multimodal application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT application, or Java Speech applications.

Voice server application (188) may be implemented as a web server, implemented in Java, C++, or another language, that supports, X+V, SALT, VoiceXML, or other multimodal languages, by providing responses to HTTP requests from X+V clients, SALT clients, Java Speech clients, or other multimodal clients. Voice server application (188) may, for a further example, be implemented as a Java server that runs on a Java Virtual Machine (102) and supports a Java voice framework by providing responses to HTTP requests from Java client applications running on multimodal devices. And voice server applications that support embodiments of the present inventive subject matter may be implemented in other ways as may occur to those of skill in the art, and all such ways are well within the scope of the present inventive subject matter.

The voice server (151) in this example includes a speech engine (153). The speech engine is a functional module, typically a software module, although it may include specialized hardware also, that does the work of recognizing and generating human speech. The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates SFVs with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine. Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The grammar (104) communicates to the ASR engine (150) the words and sequences of words that currently may be recognized. For precise understanding, distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same.

Grammars may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') form the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V <form>. A grammar's definition may be expressed in-line in a dialog. Or the grammar may be implemented externally in a separate grammar document and reference from with a dialog with a URI. Here is an example of a grammar expressed in JSFG:

```
<grammar scope="dialog" ><![CDATA[
    #JSGF V1.0;
    grammar command;
    <command> = [remind me to] call | phone | telephone
    <name><when>;
    <name> = bob | martha | joe | pete | chris | john | artoush;
    <when> = today | this afternoon | tomorrow | next week;
]]>
</grammar>
```

In this example, the elements named <command>, <name>, and <when> are rules of the grammar. Rules are a combination of a rule name and an expansion of a rule that advises an ASR engine or a voice interpreter which words presently can be recognized. In the example, expansion includes conjunction and disjunction, and the vertical bars '|' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

The voice server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars, VoiceXML input to VoiceXML interpreter (192) may originate, for example, from VoiceXML clients running remotely on multimodal devices, from X+V clients running remotely on multimodal devices, from SALT clients running on multimodal devices, or from Java client applications running remotely on multimedia devices. In this example, VoiceXML interpreter (192) interprets and executes VoiceXML segments representing voice dialog instructions received from remote multimedia devices and provided to VoiceXML interpreter (192) through voice server application (188).

A multimodal application (195) in a thin client architecture may provide voice dialog instructions, VoiceXML segments, VoiceXML <form> elements, and the like, to VoiceXML interpreter (149) through data communications across a network with multimodal application (195). The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA') (193). The VoiceXML interpreter interprets VoiceXML dialogs provided to the VoiceXML interpreter by a multimodal application.

As mentioned above, a Form Interpretation Algorithm ('FIA') drives the interaction between the user and multimodal application. The FIA is generally responsible for selecting and playing one or more speech prompts, collecting a user input, either a response that fills in one or more input items, or a throwing of some event, and interpreting actions that pertained to the newly filled in input items. The FIA also handles multimodal application initialization, grammar activation and deactivation, entering and leaving forms with matching utterances and many other tasks. The FIA also maintains an internal prompt counter that is increased with each attempt to provoke a response from a user. That is, with each failed attempt to prompt a matching speech response from a user an internal prompt counter is incremented.

Also stored in RAM (168) is an operating system (154). Operating systems useful in voice servers according to embodiments of the present inventive subject matter include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 2 are shown in RAM (168), but many components of such software typical are stored in non-volatile memory also, for example, on a disk drive (170).

Figure 2:
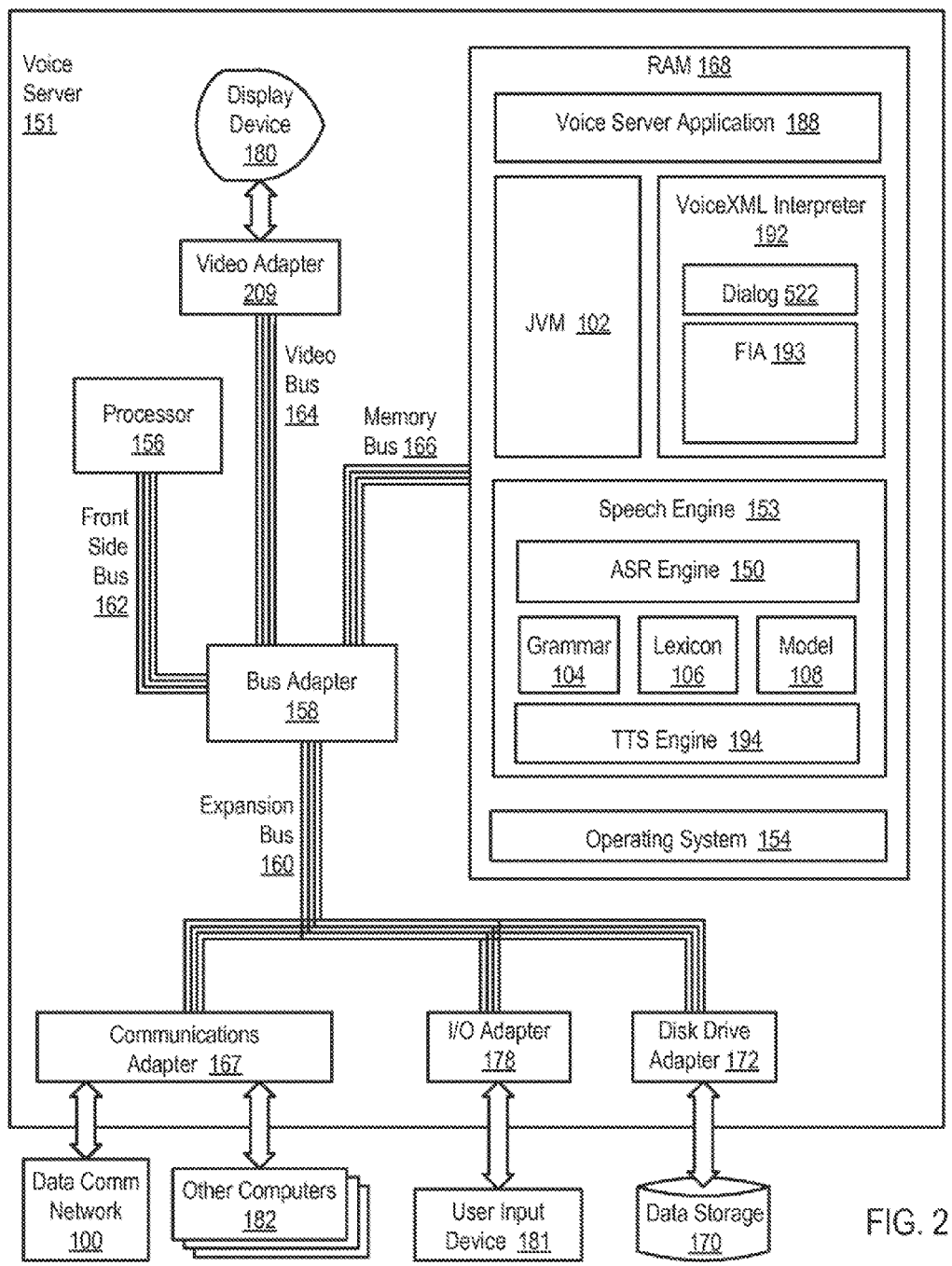

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present inventive subject matter include the Intel Northbridge, the Intel Memory Controller Hub, the Intel Southbridge, and the Intel I/O Controller Hub. Examples of expansion buses useful in voice servers according to embodiments of the present inventive subject matter include Industry Standard Architecture ('ISA') buses and Peripheral Component Interconnect ('PCT') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and other as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communication network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapter useful for embodiments of the present inventive subject matter include modems for wired dial-up communications, Ethernet (IEEE 802.3) adapters for wired data communications network communications, and 802.11 adapters for wireless data communications network communications.

Figure 3:
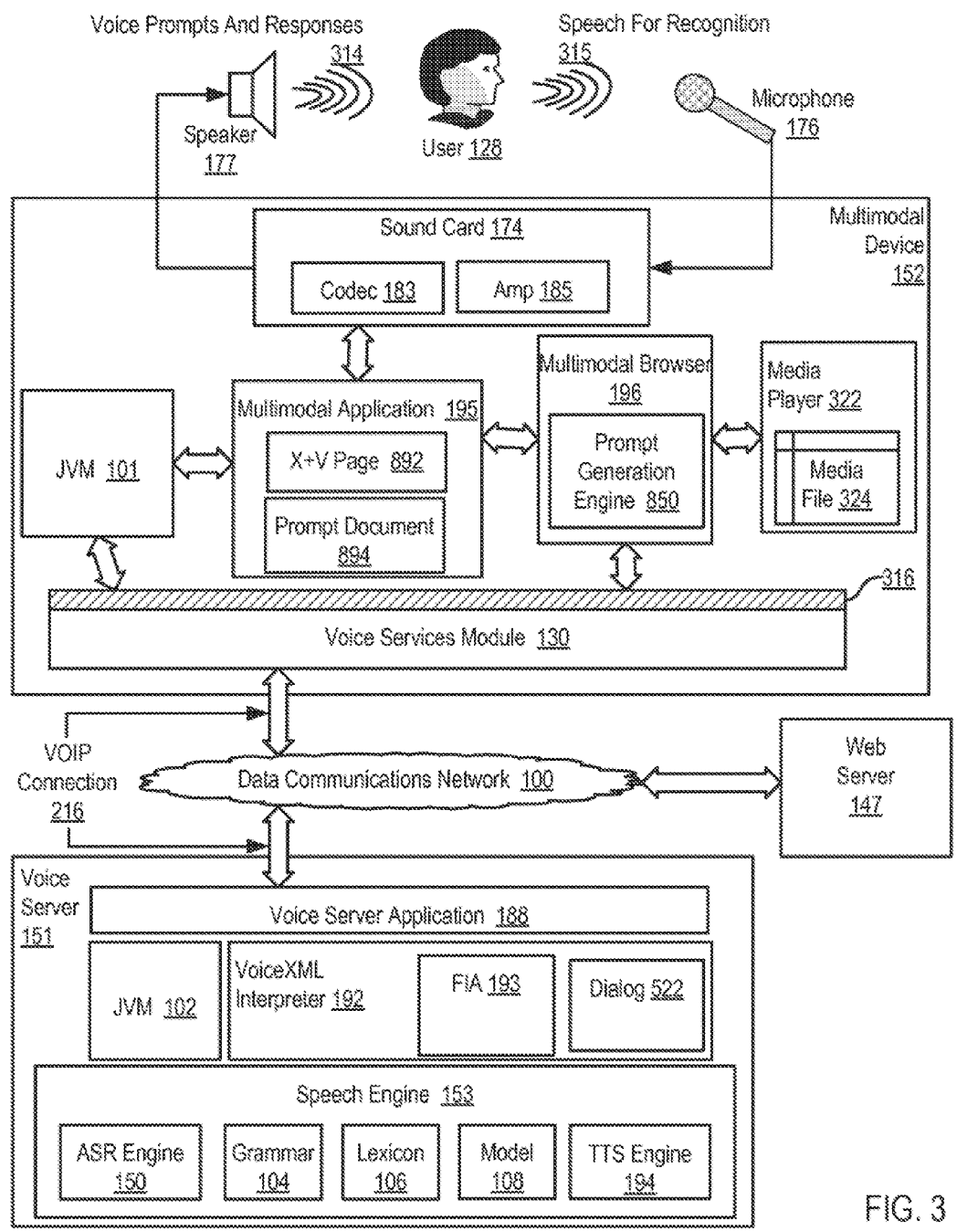
FIG. 3 sets forth a functional block diagram of exemplary apparatus for improving speech capabilities of a multimodal application in a thin client architecture according to embodiments of the present inventive subject matter.

For further explanation, FIG. 3 sets forth a functional block diagram of exemplary apparatus for improving speech capabilities of a multimodal application and dynamically extending the speech prompts of a multimodal application according to the present inventive subject matter in a thin client architecture according to embodiments of the present inventive subject matter. The example of FIG. 3 includes a multimodal device (152) and a voice server (151) connected for data communication by a VOIP connection (216) through a data communications network (100). A multimodal application (195) runs on the multimodal device (152), and a voice server application (188) runs on the voice server (151). The multimodal client application (195) may be a set or sequence of X+V (892) or SALT documents that execute of multimodal browser (196), a Java voice application that executes on the Java Virtual Machine (101), or a multimodal application implemented in other technologies as may occur to those of skill in the art. The multimodal client application (195) also includes a prompt document (894). A prompt document is a markup documents making up a multimodal application that includes speech prompts. The example multimodal device of FIG. 3 also includes a sound card (174), which is an example of an I/O adapter specially designed for accepting analog audio signals from a microphone (176) and converting the audio analog signals to digital form for further processing by a codec (183).

In addition to the multimodal server application (188), the voice server (151) also has installed upon it a speech engine (153) with an ASR engine (150), a grammar (104), a lexicon (106), a language-specific acoustic model (108), and a TTS engine (194), as well as JVM (102), and a Voice XML interpreter (192). VoiceXML interpreter (192) interprets and executes VoiceXML dialog instructions received from the multimodal application and provided to VoiceXML interpreter (192) through voice server application (188). VoiceXML input to VoiceXML interpreter (192) may originate from the multimodal application (195) implemented as an X+V client running remotely on the multimodal device (152). As noted above, the multimedia device application (195) also may be implemented as a Java client application running remotely on the multimedia device (152), a SALT application running remotely on the multimedia device (152), and in other ways as may occur to those of skill in the art.

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications network lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operates in a manner that is similar to the operation of the system of FIG. 2 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal application (195) then packages the digitized speech in a recognition request message according to a VOIP protocol, and transmits the speech to voice server (151) through the VOIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts as well as voice prompts. Voice server application (188) includes computer program instructions that provide text-to-speech ('TTS') conversion for voice prompts and voice responses to user input in multimodal applications such as, for example, X+V applications, SALT applications, or Java Speech applications.

The voice server application (188) receives speech for recognition from a user and passes the speech through API calls to VoiceXML interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

A multimodal application (195), in some embodiments of the present inventive subject matter, may run in a multimodal browser (196). The multimodal browser of FIG. 3 is capable of receiving a media file having a metadata container, retrieving from the metadata container a speech artifact related to content stored in the media file for inclusion in the speech engine available to the multimodal browser, determining whether the speech artifact includes a grammar rule or a pronunciation rule. If the speech artifact includes a grammar rule, the multimodal browser is capable of modifying the grammar of the speech engine to include the grammar rule. If the speech artifact includes a pronunciation rule, the multimodal browser is capable of modifying the lexicon of the speech engine to include the pronunciation rule.

The multimodal browser of FIG. 3 also includes a prompt generation engine (850) capable of dynamically extending the speech prompts of a multimodal application according to embodiments of the present inventive subject matter. The prompt generation engine (850) comprises automated computing machinery capable of receiving a media file (324) having a metadata container; retrieving from the metadata container a speech prompt related to content stored in the media file (324) for inclusion in the multimodal application (195); and modifying the multimodal application (195) to include the speech prompt (806). The prompt generation engine, in many embodiments of the present inventive subject matter, carries out dynamically extending the speech prompts when importing the media file onto the multimodal device. In the example of FIG. 3, the prompt generation engine is included in the multimodal browser. This is for example, and not for limitation. In fact, the prompt generation engine may be implemented as a stand-along module, included in a multimodal media player, or included in other modules as will occur to those of skill in the art.

The multimodal application (195) is operatively coupled to the ASR engine (150). In this example, the operative coupling between the multimodal application and the ASR engine (150) is implemented with a VOIP connection (216) through a voice services module (130), then through the voice server application (188) and either JVM (102), VoiceXML interpreter (192), or SALT interprets (103), depending on whether the multimodal application is implemented in X+V, Java, or SALT. The voice services module (130) is a thin layer of functionality, a module of computer program instructions, that presents an API (316) for use by an application level program in providing dialog instructions and speech for recognition to a voice server application (188) and receiving in response voice prompts and other responses. In this example, application level programs are represented by multimodal application (195), JVM (101), and multimodal browser (196).

The voice services module (130) provides data communications services through the VOIP connection and the voice server application (188) between the multimodal device (152) and the VoiceXML interpreter (192). The API (316) is the same API presented to applications by a VoiceXML interpreter when the VoiceXML interpreter is installed on the multimodal device in a thick client architecture (316 on FIG. 4). So form the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal application (195) when the multimodal application is implemented with X+V. And calls to the API (316) may be issued from the JVM (101), which provides an execution environment for the multimodal application (195) when the multimodal application is implemented with Java.

Figure 4:
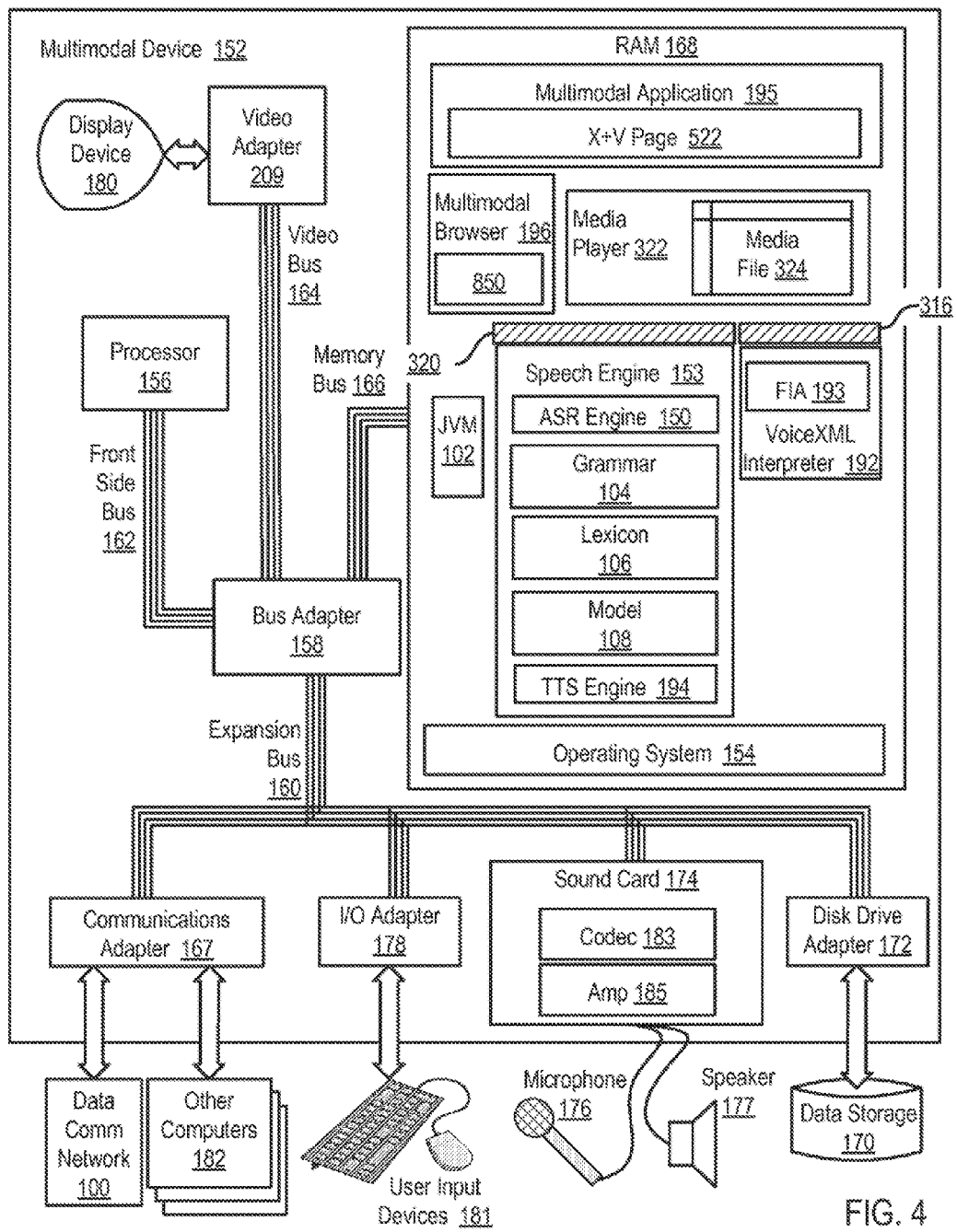
FIG. 4 sets forth a block diagram of automated computing machinery comprising an example of a computer useful as a multimodal device in improving speech capabilities of a multimodal application according to embodiments of the present inventive subject matter.

Improving speech capabilities of a multimodal application and dynamically extending the speech prompts according to embodiments of the present inventive subject matter in thick client architectures is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) for improving speech capabilities of a multimodal application and dynamically extending the speech prompts according to embodiments of the present inventive subject matter. In a multimodal device implementing a thick client architecture as illustrated in FIG. 4, the multimodal device (152) has no connection to a remote voice server containing a VoiceXML interpreter and a speech engine. All the component needed for speech synthesis and voice recognition according to embodiments of the present inventive subject matter are installed or embedded in the multimodal device itself.

The example multimodal device (152) of FIG. 4 includes several components that are structured and operate similarly as do parallel components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a JVM (102), a VoiceXML Interpreter (192), a speech engine (153), and son on. As in the system of FIG. 4, the speech engine in the multimodal device of FIG. 2 includes an ASR engine (150), a grammar (104), a lexicon (106), a language-dependent acoustic model (108), and a TTS engine (194). The VoiceXML interpreter (192) administers such dialogs by processing the dialog instructions sequentially in accordance with a VoiceXML Form Interpretation Algorithm ('FIA') (193).

The speech engine (153) in this kind of embodiment, a thick client architecture, often is implemented as an embedded module in a small form factor device such as a handheld device, a mobile phone, PDA, and the like. An example of an embedded speech engine useful according to embodiments of the present inventive subject matter is IBM's Embedded ViaVoice Enterprise. The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and from side bus (162).

Also stored in RAM (168) in this example is a multimodal application (195), a module of computer program instructions capable of operating a multimodal device as an apparatus that supports embodiments of the present inventive subject matter. The multimodal application (195) runs with a multimodal browser (196) and implements speech recognition by accepting speech for recognition form a user and sending the speech for recognition through API calls to the ASR engine (150). The multimodal application (195) and the multimodal browser (196) implement speech synthesis generally by sending words to be used as prompts for a user to the TTS engine (194). As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal application (150) may be implemented as a set or sequence of X+V documents executing in a multimodal browser (196) or microbrowser that passes VoiceXML grammars and digitized speech by calls through an API (316) directly to an embedded VoiceXML interpreter (192) for processing. The embedded VoiceXML interpreter (192) may in turn issue requests for speech recognition through API calls directly to the embedded ASR engine (150). Multimodal application (195) also can provide speech synthesis, TTS conversion, by API calls to the embedded TTS engine (194) for voice prompts and voice responses to user input.

In further exemplary embodiments, the multimodal application (195) may be implemented as a set or sequence X+V documents or SALT documents executed on a multimodal browser (196) or microbrowser that issues calls through the VoiceXML API (316) for speech recognition and speech synthesis services. In addition to X+V, SALT, and Java implementations, multimodal application (195) may be implemented in other technologies as will occur to those of skill in the art, and all such implementations are well within the scope of the present inventive subject matter.

The multimodal application (195) is operatively coupled to the ASR engine (150) through an API (320). In this example, the operative coupling between the multimodal application and the ASR engine (150) is implemented by either JVM (102), VoiceXML interpreter (192), or SALT interpreter (103), depending on whether the multimodal application is implemented in X+V, Java, or SALT. When the multimodal application (195) is implemented in X+V, the operative coupling is effected through the multimodal browser (196), which provides and operating environment and an interpreter for the X+V application, and then through the VoiceXML interpreter, which passes grammars and voice utterances for recognition to the ASR engine. When the multimodal application (195) is implemented in Java Speech, the operative coupling is effected through the JVM (102), which provides an operating environment of the Java application and passes grammars and voice utterances for recognition to the ASR engine. When the multimodal application (195) is implemented in SALT, the operative coupling is effected through the SALT interpreter (103), which provides an operating environment and an interpreter for the X+V application and passes grammars and voice utterances for recognition to the ASR engine.

The multimodal application (195) in this example, running on a multimodal device (152) that contains its own VoiceXML interpreter (192) and its own speech engine (153) with no network or VOIP connection to a remote voice server containing a remote VoiceXML interpreter or a remote speech engine, is an example of a so-called 'thick client architecture,' so-called because all of the functionality for processing voice mode interactions between a user and the multimodal application—as well as the functionality for speech recognition—is implemented on the multimodal device itself.

The multimodal browser (196) of FIG. 4 operates generally to carry out improving speech capabilities of a multimodal application by receiving a media file (324) having a metadata container; retrieving from the metadata container a speech artifact related to content stored in the media file (324) for inclusion in the speech engine (153) available to the multimodal browser; determining whether the speech artifact includes a grammar rule or a pronunciation rule; if the speech artifact includes a grammar rule, modifying the grammar (104) of the speech engine to include the grammar rule; and if the speech artifact includes a pronunciation rule, modifying the lexicon (106) of the speech engine to include the pronunciation rule.

The multimodal browser of FIG. 4 also includes a prompt generation engine (850) capable of dynamically extending the speech prompts of a multimodal application according to embodiments of the present inventive subject matter. The prompt generation engine (850) comprises automated computing machinery capable of receiving a media file (324) having a metadata container; retrieving from the metadata container a speech prompt related to content store in the media file (324) for inclusion in the multimodal application (195); and modifying the multimodal application (195) to include the speech prompt (806). The prompt generation engine, in many embodiments of the present inventive subject matter, carries out dynamically extending the speech prompts when importing the media file onto the multimodal device. In the example of FIG. 3, the prompt generation engine is included in the multimodal browser. This is for example, and not for limitation. In fact, the prompt generation engine may be implemented as a stand-along module, included in a multimodal media player, or included in other modules as will occur to those of skill in the art.

Figure 5:
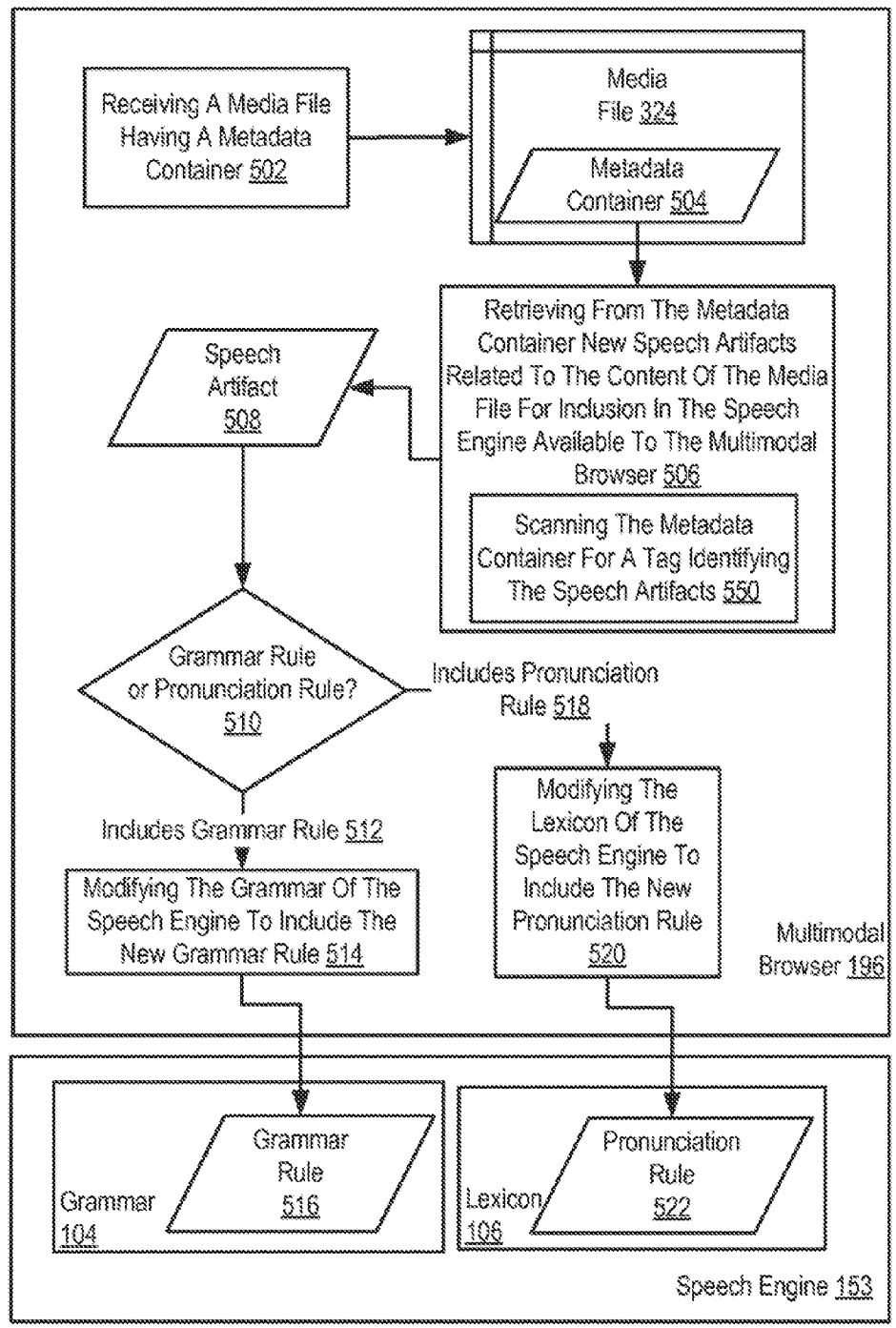
FIG. 5 sets forth a flow chart illustrating an exemplary method for improving speech capabilities of a multimodal application according to embodiments of the present inventive subject matter.

For further explanation, FIG. 5 sets forth a flow chart illustrating a method of improving speech capabilities of a multimodal application. The method of FIG. 5 is implemented with a multimodal browser (196) and a speech engine (153) operating on a multimodal device supporting multiple modes of user interaction with the multimodal application. The modes of user interaction supported by the multimodal device include a voice mode and one or more non-voice modes. The voice mode includes accepting speech input from a user, digitizing the speech, and providing digitized speech to a speech engine available to the multimodal browser for recognition. The non-voice mode includes accepting input from a user through physical user interaction with a user input device for the multimodal device. The multimodal browser comprises a module of automated computing machinery for executing the multimodal application and also supports the execution of a media file player. Such a media file player is capable of playing media files such as audio or video files. Examples of such media files include MPEG3 ('.mp3') files, MPEG4 ('.mp4') files, Advanced Audio Coding ('AAC') compressed files, Advances Streaming Format ('ASF') Files, WAV files, and many others as will occur to those of skill in the art.

The method of FIG. 5 includes receiving (502), by the multimodal browser (196), a media file (324) having a metadata container (504). A metadata container contains metadata describing the content of the media file. Such content may include, for example, the name of the artist of the song contained in the media file, the name of the album associated with that song, album art, the name of the song contained in the media file, and any other metadata that will occur to those of skill in the art.

MPEG media files support a metadata container called ID3 tags. One particular form of the ID3 tag is an ID3v2 tag. ID3v2 tag provides a container for metadata associated with the media file. An ID3v2 tag includes one or more frames supporting the inclusion of text, images, files and other information. ID3v2 tags are flexible and expandable because parsers that do not support specific functions of an ID3v2 tag will ignore those functions. ID3v2 supports Unicode thereby providing the ability to include extracted text of many different languages. The maximum tag size of an ID3v2 tag is typically 256 megabytes and maximum frame size is typically 16 megabytes.

The method of FIG. 5 includes retrieving (506), by the multimodal browser (196), from the metadata container (504) a speech artifact (508) related to content stored in the media file (324) for inclusion in the speech engine (153) available to the multimodal browser (196). A speech artifact is one or more individual speech rules for inclusion in either a grammar or lexicon available to a speech engine used by a multimodal browser for use in executing a multimodal application. Such speech artifacts are often embodied in an XML document. The artifact may be extracted from the XML document and included in a larger grammar defining the words understood by the speech recognition engine or in a lexicon defining the manner in which the words so recognized are pronounced.

In the method of FIG. 5, retrieving (506), by the multimodal browser (196), from the metadata container (504) a speech artifact (508) for inclusion in a speech engine (153) available to the multimodal browser (196) is carried out by scanning (550) the metadata container (504) for a tag identifying the speech artifact (508). Scanning the metadata container for a tag identifying the speech artifacts may be carried out by scanning an ID3 container of an MPEG media file for a frame identifying speech artifacts. As mentioned above, ID3v2 tags includes one or more frames supporting the inclusion of text, image, files, and other information. Such ID3 tags may be expanded to include frames for speech artifacts. Such a new frame may identify a grammar rule of a lexicon for inclusion in a speech engine.

The method of FIG. 5 includes determining (510) whether the speech artifact (508) includes a grammar rule of a pronunciation rule. Determining (510) whether the speech artifact (508) includes a grammar rule or a pronunciation rule may be carried out by identifying a frame in an ID3 tag designating a grammar rule or a pronunciation rule. A grammar rule identifies words and sequences of words that may be recognized by a speech engine in executing a multimodal application. A pronunciation rule identifies an association of words in text form with phonemes representing pronunciations of the words If the speech artifact includes a grammar rule (512), the method of FIG. 5 includes modifying (514), by the multimodal browser (196), the grammar (104) of the speech engine (153) to include the grammar rule (516). Modifying (514), by the multimodal browser (196), the grammar (104) of the speech engine (153) to include the grammar rule (516) may be carried out by calling functions in an API exposed by the speech engine to modify the grammar of the speech engine to include the grammar rule (516).

If the speech artifact includes a pronunciation rule (518), the method of FIG. 5 includes modifying (520), by the multimodal browser (196), the lexicon (106) of the speech engine (153) to include the pronunciation role (522). Modifying (520), by the multimodal browser (196), the lexicon (106) of the speech engine (153) to include the pronunciation rule (522) may be carried out by calling functions in an API exposed by the speech engine to modify the lexicon (106) of the speech engine to include the pronunciation rule (518).

Figure 6:
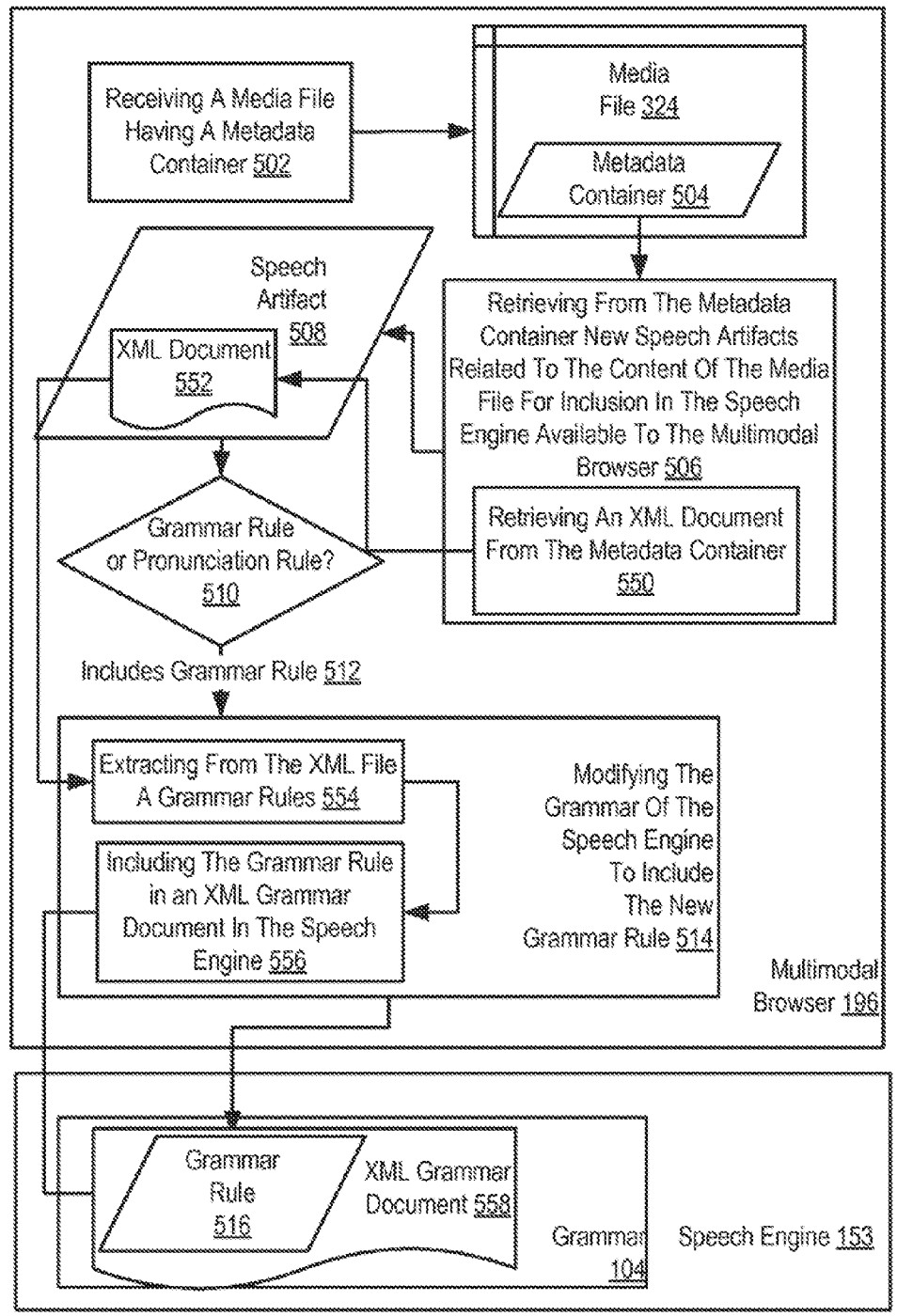
FIG. 6 sets forth a flow chart illustrating an exemplary method of improving speech capabilities of a multimodal application.

For further explanation, FIG. 6 sets forth a flow chart illustrating an exemplary method of improving speech capabilities of a multimodal application. The method of FIG. 6 is similar to the method of FIG. 5 in that the method of FIG. 6 includes receiving (502), by the multimodal browser (196), a media file (324) having a metadata container (504); retrieving (506), by the multimodal browser (196), from the metadata container (504) a speech artifact (508) related to content stored in the media file (324) for inclusion in the speech engine (153) available to the multimodal browser (196); determining (510) whether the speech artifact (508) includes a grammar rule of a pronunciation rule and if the speech artifact includes a grammar rule (512), modifying (514), by the multimodal browser (196), the grammar (104) of the speech engine (153) to include the grammar rule (516); and if the speech artifact includes a pronunciation rule (518), modifying (520), by the multimodal browser (196), the lexicon (106) of the speech engine (153) to include the pronunciation rule (522).

In the method of FIG. 6, retrieving (506), by the multimodal browser (196), from the metadata container (504) a speech artifact (508) for inclusion in a speech engine (153) available to the multimodal browser (196) includes retrieving (550) an XML document (552) from the metadata container (504). Such an XML document includes text of a grammar rule for inclusion in a speech engine.

In the method of FIG. 6, modifying (514), by the multimodal browser (196), the grammar (104) of the speech engine (153) to include the grammar rule (516) includes extracting (554) from the XML document (552) retrieved fro the metadata container a grammar rule and including (556) the grammar rule (516) in an XML grammar document in the speech engine (153). Extracting (554) from the XML document (552) retrieved from the metadata container a grammar rule and including (556) the grammar rule (516) in an XML grammar document in the speech engine (153) may include copying the text of the grammar rule from the XML document and providing the text to a speech engine through a function call parameterized with the text for inclusion in the XML grammar document in the speech engine.

Figure 7:
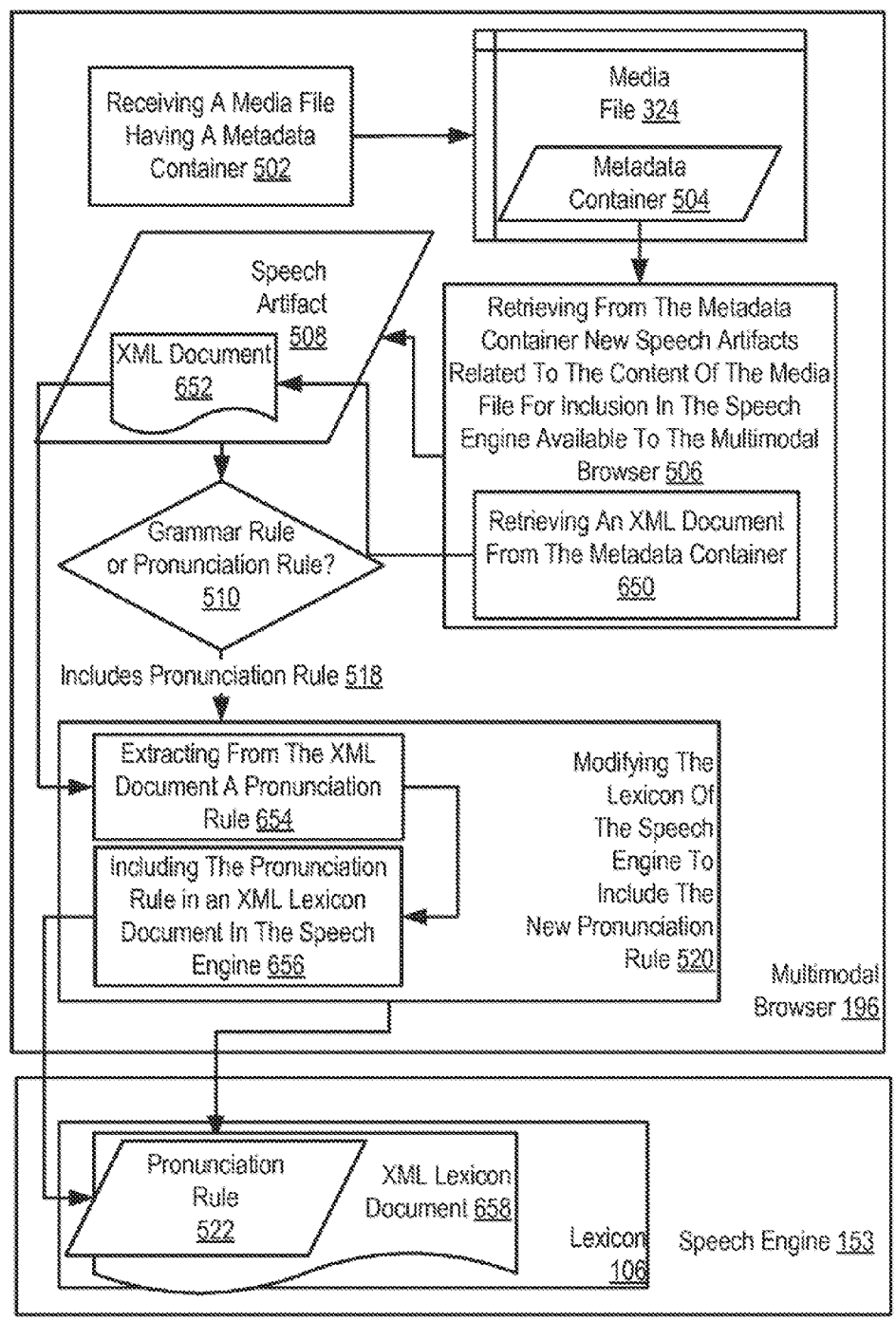
FIG. 7 sets forth a flow chart illustrating an exemplary method of improving speech capabilities of a multimodal application.

For further explanation, FIG. 7 sets forth a flow chart illustrating an exemplary method of improving speech capabilities of a multimodal application. The method of FIG. 7 is similar to the method of FIG. 5 in that the method of FIG. 7 includes receiving (502), by the multimodal browser (196), a media file (324) having a metadata container (504); retrieving (506), by the multimodal browser (196), from the metadata container (504) a speech artifact (508) related to content stored in the media file (324) for inclusion in the speech engine (153) available to the multimodal browser (196); determining (510) whether the speech artifact (508) includes a grammar rule or a pronunciation rule and if the speech artifact includes a grammar rule (512), modifying (514), by the multimodal browser (196), the grammar (104) of the speech engine (153) to include the grammar rule (516); and if the speech artifact includes a pronunciation rule (518), modifying (520), by the multimodal browser (196), the lexicon (106) of the speech engine (153) to include the pronunciation rule (522).

In the method of FIG. 7, retrieving (506), by the multimodal browser (196), from the metadata container (504) a speech artifact (508) for inclusion in a speech engine (153) available to the multimodal browser (196) includes retrieving (650) an XML document (652) from the metadata container (504). Such an XML document includes text of a pronunciation rule for inclusion in a speech engine.

In the method of FIG. 7, modifying (520), by the multimodal browser (196), the lexicon (106) of the speech engine (153) to include the pronunciation rule (522) includes extracting (654) from the XML document (652) retrieved from the metadata container a pronunciation rule and including (656) the pronunciation rule (522) in an XML lexicon document (658) in the speech engine (153). Extracting (654) from the XML document (652) retrieved from the metadata container a pronunciation rule and including (656) the pronunciation rule (522) in an XML lexicon document (658) in the speech engine (153) may include copying the text of the grammar rule from the XML document and providing the text to a speech engine through a function call parameterized with the text for inclusion in the XML grammar document in the speech engine.

For further explanation, consider the following use case for improving speech capabilities of a multimodal application according to embodiments of the present inventive subject matter. A multimodal browser configured according to embodiments of the present inventive subject matter receives a media file having an ID3 metadata container and retrieves from the ID3 metadata container the following speech artifact embodied in an XML document related to content stored in the media file for inclusion in the speech engine available to the multimodal browser:

```
<?xml version="1.0" encoding ="iso-8859-1"?>
<!DOCTYPE grammar PUBLIC "-//W3C//DTD GRAMMAR 1.0//EN"
"http://www.w3.org/TR/speech-grammar/gr
<grammer version="1.0" xmlns= "http://www.w3.org/2001/06/grammar"
xml:lang="en-US" root="artist-nam
<rule id="artist-names" scope="public">
    <tag><id3-frame>TPENameGrammar</id3-frame></tag>
    <one-of>
        <item>John Cougar</item>
        <item>John Cougar Mellencamp</item>
        <item>John Mellencamp</item>
    </one-of>
</rule>
</grammar>
```

A multimodal browser according to embodiments of the present inventive subject matter determines whether the speech artifact includes a grammar rule or a pronunciation rule. In this example, the speech artifact is a grammar rule so identified by the ID3 tag frame 'TPENameGrammar' which is predefined to identify grammar rules for names of artists. The grammar rule id identifies the grammar rule as a rule for artist names. In this case the grammar rule identifies three artist names associated with the content of the media file, "John Cougar, "John Cougar Mellencamp," and "John Mellencamp" A multimodal browser according to embodiments of the present inventive subject matter then may include this grammar rule in an XML grammar of a speech engine by providing the text of the grammar rule for inclusion in the grammar of the speech engine. Multimodal applications for playing songs by John Cougar Mellencamp may now usefully be speech driven using any one of the three names used by John Cougar Mellencamp during his career, "John Cougar, "John Cougar Mellencamp," and "John Mellencamp" Such applications may have been incapable of a voice mode using all three names prior to the inclusion of the grammar rule.

Continuing now with a use case for pronunciation rules, a multimodal browser configured according to embodiments of the present inventive subject matter receives a media file having an ID3 metadata container and retrieves from the ID3 metadata container the following speech artifact embodied in a XML document related to content stored in the media file for inclusion in the speech engine available to the multimodal browser:

```
<?xml version"1.0" encoding ="iso-8859-1"?>
<!DOCTYPE grammer PUBLIC"-//W3C//DTD GRAMMAR 1.0//EN"
"http://www.w3.org/TR/speech-grammar/gr
<grammar version="1.0" xmlns="http://www.w3.org/2001/06/grammar"
xml:lang="en-US" root="artist-name"
<lexicon uri="id3://TPEPronunciationName"/>
    <rule id="artist-names" scope="public">
    <one-of>
    <item>Sade</item>
    </one-of>
    </rule>
</grammar>
```

A multimodal browser according to embodiments of the present inventive subject matter determines whether the speech artifact includes a grammar rule or a pronunciation rule. In this example the speech artifact is a pronunciation rule so identified by the ID3 tag frame 'TPEPronunciationName' which is predefined to identify pronunciation rules for names of artists. The pronunciation rule id identifies the grammar word associated with a pronunciation rule which is 'Sade,' an artist name that is typically difficult for a speech recognition engine to recognize and a text-to-speech engine to correctly pronounce. Sade is pronounced 'Shaaday.' The XML document above also references a URI containing an XML pronunciation rule and the multimodal browser retrieves the XML pronunciation rule below:

```
<?xml version="1.0" encoding="UTF-8"?>
<lexicon version="1.0"
xmlns="http://www.w3.org/2005/01/pronunciation-lexicon"
xmlns:xsi="http://www.w3.org/2001/XMLSchema-instance"
xsi:schemaLocation="http://www.w3.org/2005/01/pronunciation-lexicon
http://www.w3.org/TR/2007/CR-pronunciation-lexicon-20071212/pls.xsd"
alphabet="ipa" xml:lang="en-GB">
<lexeme>
    <grapheme>Sade</grapheme>
    <phoneme>SH AA D EY</phoneme>
    </lexeme>
</lexicon>
```

In this example, the pronunciation rule identifies by the tag <grapheme> that the name of the artist whose pronunciation is being defined by the pronunciation rule is 'Sade.' The pronunciation rule also defines the pronunciation of Sade with the tag <phoneme> identifying the phonemes for correct pronunciation of the artist Sade. A multimodal browser according to embodiments of the present inventive subject matter then may include this pronunciation rule in an XML lexicon of a speech engine by providing the text of the pronunciation rule for inclusion in the lexicon of the speech engine.

Multimodal applications for playing songs by Sade may now usefully be speech driven using the proper pronunciation of the artist's name. Such applications may have been incapable of a voice mode using the proper pronunciation of the artist's name prior to the inclusion of the pronunciation rule.

Multimodal applications previously unable to recognize particular words or pronunciations of words related to the content of a media file may now usefully interact with users using those particular words or pronunciations as the grammars and lexicons of the speech engine have been improved for use with multimodal applications. However, the recognition of those words and pronunciations by a speech engine does not affect the multimodal application's ability to prompt a user for multimodal interaction related to the content of the media file. That is, without more, the multimodal application will usefully accept as responses to prompts words and pronunciations of words that the multimodal application will not use in prompting a user. Therefore, a multimodal application's speech prompt may also be extended to include specific prompt related to the content of a media file.

Figure 8:
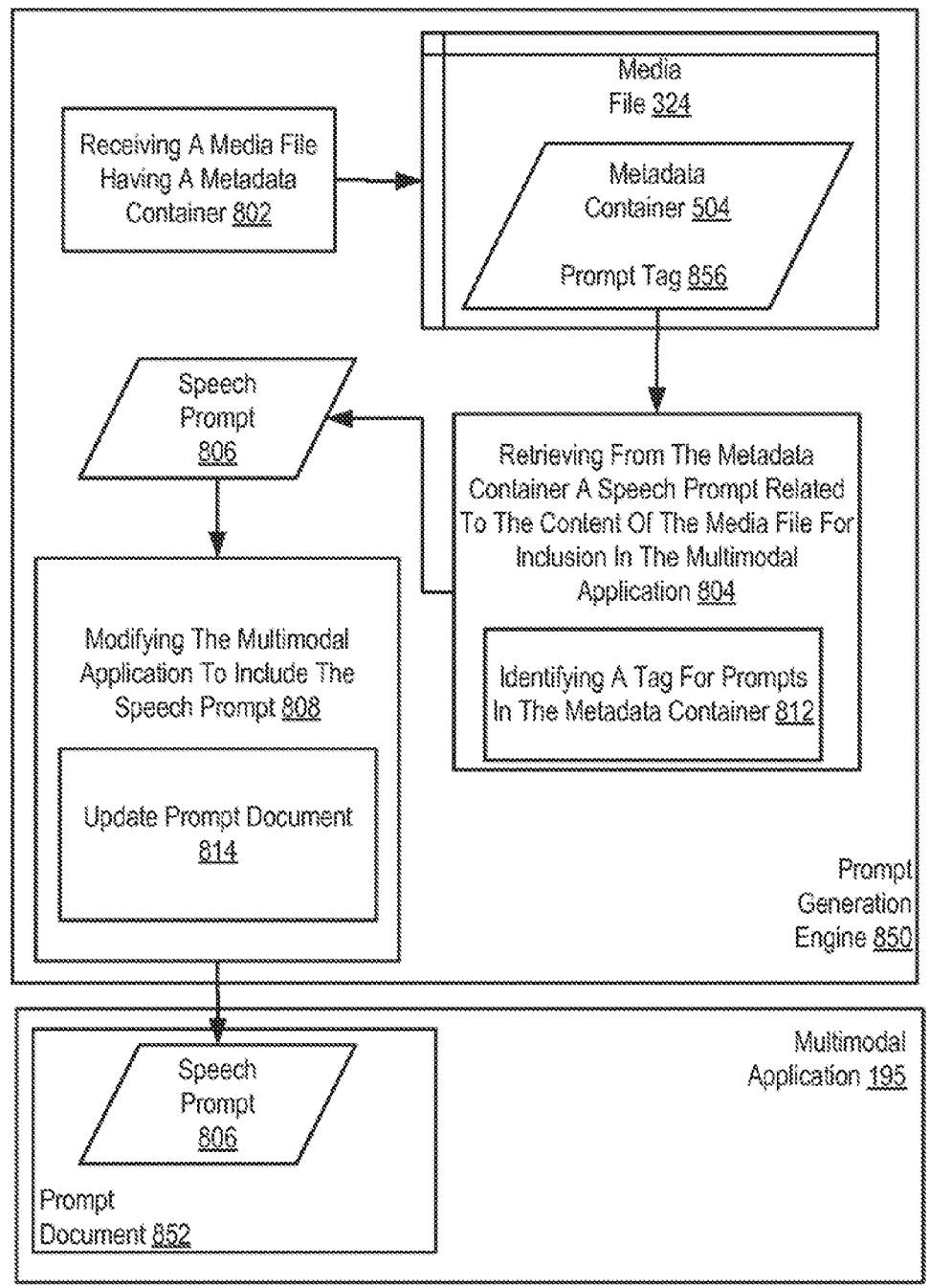
FIG. 8 sets forth a flow chart illustrating am exemplary method of dynamically extending the speech prompts of a multimodal application.

For further explanation, FIG. 8 sets forth a flow chart illustrating an exemplary method of dynamically extending the speech prompts of a multimodal application. The method of FIG. 8 is implemented with a prompt generation engine (850), a module of automated computing machinery operating on a multimodal device supporting multiple modes of user interaction with the multimodal application. Those multiple modes of user interaction include a voice mode and one more non-voice modes. The voice mode includes accepting speech input from a user, digitizing the speech, and providing digitized speech to a speech engine. The non-voice mode includes accepting input from a user through physical user interaction with a user input device for the multimodal device. The multimodal device comprises a module of automated computing machinery for executing the multimodal application and supports execution of a media file player, a module of automated computing machinery for playing media files.

The method of FIG. 8 includes receiving (802), by the prompt generation engine (850), a media file (324) having a metadata container (504). Receiving (802) a media file (324) having a metadata container (504) is typically carried out as part of the process of importing the media file to the multimodal device such that the media file may be played using the multimodal device's media file player.

As mentioned above, a metadata container contains metadata describing the content of the media file. Such content may include, for example, the name of the artist of the song contained in the media file, the name of the album associated with that song, album art, the name of the song contained in the media file, and any other metadata that will occur to those of skill in the art.

MPEG media files support a metadata container called ID3 tags. One particular form of the ID3 tag is an ID3v2 tag provides a container for metadata associated with the media file. An ID3v2 tag includes one or more frames supporting the inclusion of text, images, files, and other information. ID3v2 tags are flexible and expandable because parsers that do not support specific functions of an ID3v2 tag will ignore those function. ID3v2 supports Unicode thereby providing the ability to include extracted text of many different languages. The maximum tag size of an ID3v2 tag is typically 256 megabytes and maximum frame size is typically 16 megabytes.

The method of FIG. 8 also includes retrieving (804), by the prompt generation engine (850) from the metadata container (504), a speech prompt (806) related to content stored in the media file (324) for inclusion in the multimodal application (195). A speech prompt is an audio phrase played by a multimodal application to provoke a response from a user. Speech prompts and their response typically drive the interaction between a multimodal application and a user. Speech prompts retrieved from the metadata container of a medial file may be in the form of text to be rendered as speech with a text-to-speech engine of in the form of an audio file to be played by the multimodal application and multimodal device. Retrieving, by the prompt generation engine, from the metadata container a speech prompt related to content stored in the media file for inclusion in the multimodal application, therefore, in alternative embodiments, may include retrieving a text string prompt for execution by a text to speech engine or retrieving an audio prompt to be played by the multimodal device.

In the method of FIG. 8, retrieving (804), by the prompt generation engine (850), from the metadata container (504) a speech prompt (806) related to content stored in the media file (324) for inclusion in the multimodal application (195) is carried out by identifying (812) a tag (856) for prompts in the metadata container (504). Identifying (812) a tag (856) for prompts in the metadata container (504) may include identifying a frame for prompts in an ID3 container of an MPEG media file. As mentioned above, ID3v2 tags includes one or more frames supporting the inclusion of text, images, files, and other information. Such ID3 tags may be expanded to include frames for speech prompts, such as, for example, the tag 'TPESpeechPromptArtistName' to identify the speech prompt of an artist's name of the a song contained in the media file. Such a new frame may identify a speech prompt for inclusion in a multimodal application.

The method of FIG. 8 also includes modifying (808), by the prompt generation engine (850), the multimodal application (195) to include the speech prompt (806). In the method of FIG. 8 modifying (808), by the prompt generation engine (850), the multimodal application (195) to include the speech prompt (806) is carried out by updating (814) a prompt document (852) with the retrieved speech prompt (806). A prompt document is one of the markup documents making up a multimodal application that includes speech prompts for use by the multimodal application. Updating a prompt document may include copying body of the speech prompt from the metadata container to an existing prompt document of creating a new prompt document including the speech prompt. For further explanation, consider the following exemplary prompt document updated according to embodiments of the present inventive subject matter:

```
<!DOCTYPE html PUBLIC "-//VoiceXML Forum//DTD
XHTML+Voice 1.2//EN"
"http://www.voicexml.org/specs/multimodal/x+v/12/dtd/xhtml+voice1
2.dtd">
<html xmlns="http://www.w3.org/1999/xhtml"
    xmlns:vxml="http://www.w3.org/2001/vxml"
    xmlns:ev="http://www.w3.org/2001/xml-events"
    xmlns:xv="http://www.voicexml.org/2002/xhtml+voice"
xml:lang="en-US">
<p id="john-cougar-playlist">Pick one of your John Cougar songs:
Walk Tall, Pink Houses, Lonely Ol' Nights</p>
<p id="sade-playlist">You've got Sade's greatest hits: Smooth
Operator, Your Love is King, No Ordinary Love</p>
<media id="dillon-playlist"
src="id3://TPESpeechPromptArtistPlaylist"/>
</html>
```

In the example above, two text string were retrieved from a metadata container of a media file and included in the updated prompt document above. Each speech prompt was assigned a prompt id identifying the prompt as a text string. The tag '<p id="john-cougar-playlist">' identifies a prompt for a playlist of the artist 'John Cougar.' A multimodal application using the updated prompt document is now capable of rendering the speech prompt with a text to speech engine to say "Pick one of your John Cougar songs: Walk Tall, Pink Houses, Lonely Ol' Nights." Similarly, the tag '<p id="sade-playlist">' identifies a prompt for a playlist of the artist 'Sade.' A multimodal application using the updated prompt document is now capable of rendering the speech prompt with a text to speech engine to say "You've got Sade's greatest hits: Smooth Operator, Your love is King, No Ordinary Love."

Also in the example above, one additional speech prompt is included in the updated prompt document that is embodied as an audio file. The audio file speech prompt was assigned a prompt id identifying the prompt as an audio file. The tag <media id="dillon-playlist" src="id3://TPESpeechPromptArtistPlaylist"/> identifies a speech prompt as an audio file for a playlist of the artist 'Bob Dillon.' Such an audio speech prompt may be a recorded prompt made by the artists themselves or by any other person or process.

A multimodal application unable to render the speech prompts above prior to updating the prompt document may render each of the speech prompts above after the prompt document is updated according to embodiments of the present inventive subject matter. For further explanation, consider the following snippet of a multimodal application:

```
<!DOCTYPE html PUBLIC "-//VoiceXML Forum//DTD
XHTML+Voice 1.2//EN"
"http://www.voicexml.org/specs/multimodal/x+v/12/dtd/xhtml+voicel
2.dtd">
<html xmlns="http://www.w3.org/1999/xhtml"
    xmlns:vxml="http://www.w3.org/2001/vxml"
    xmlns:ev="http://www.w3.org/2001.xml-events"
    xmlns:xv="http://www.voicexml.org/2002/xhtml+voice"
xml:lang="en-US">
<head>
<title> Dynamically Extending The Speech Prompts Of A
Multimodal Application</title>
<script type="text/javascript">
    <![CDATA[
    function play(name)
    {
    // This uses the multimedia interfaces on the device to
    // play media by the artist in "name"
    }
    function updaytPlayList( )
    {
    // Uses the artist selection to update playlist with a
    // list of songs to select from
    }
    function getPrompt(name)
    {
    return "prompt/#" + $ArtistName + "-playlist";
    }
    function getSongListGrammar(name)
    { return "grammar/#" + $name + "-playlist";
    }
    ]]>
    </script>
    <!-- First prompt for the artist name -->
    <vxml:form id="vform1">
    <vxml:filed name="Artistname">
    <vxml:prompt src="#pl"/>
    <vxml:gmmmar src="namelist/grm">
    </vxml:grammar>
    </vxml:field>
    <!-- Next get the songname for the selected artist -->
    <vxml:field name="songname">
    <vxml:prompt srcexpr=="getprompt($Artistname)"/>
    <vxml:grammar srcexpr="getSongListGrammar($name)">
    </vxml:grammar>
    <vxml:filled>
    <vxml:assign name="temp" expr="play($songname)"/>
    </vxml:filled>
    </vxml:field> <
/vxml:form>
    <listener event="load" oberver="main" target="main"
handler="#vform1"/>
    </head>
    <body id="main">
    <form action="">
    <p id="pl">Pick an artist to play</p>
    <select id="artist" size="5" onselect="upDatePlayList( )">
    <option value="Sade">Sade<option/>
    <option value="John Cougar">John Cougar<option/>
    <option value="Bob Dillon">Bob Dillon<option/>
    </select>
    <select id="playlist"/>
    <input type="button" value="Play"
onclick="play(getElementById('playlist')value)"/>
    </form>
    </body>
</html>
```

In the example above, the function getPrompt(name) dynamically generates a prompt name. Such a function was unable generate a prompt name for the speech prompts in the updated prompt document in response to a user's saying 'John Cougar,' 'Sade,' or 'Bob Dillion' prior to updating the prompt document above. In the example above, the segment:

```
<vxml:form id="vform1">
    <vxml:field name="Artistname">
        <vxml:prompt src="#pl"/>
        <vxml:grammar src="namelist.grm">
        </vxml:grammar>
    </vxml:field>
``` prompts a user for an artist name. The artist's names 'John Cougar,' 'Bob Dillion,' and 'Sade,' may now be recognized by the speech engine as a response to the prompt because the speech engine was updated according to the methods of FIGS. 5-7. Having correctly recognized the artist selected by a user, after carrying out the method of FIG. 8, a multimodal application may prompt a user with a speech prompt retrieved by a prompt generation engine from the metadata container of a media file for inclusion in the multimodal application using the following segment of the multimodal application above:

```
<vxml:field name="songname">
    <vxml:prompt srcexpr="getprompt($Artistname)"/>
    <vxml:grammar srcexpr="getSongListGrammar($Artistname)"/>
    </vxml:grammar>
    <vxml:filled> <
        vxml:assign name="temp" expr="play($songname)"/>
    </vxml:filled>
    </vxml:field>
</vxml:form>
```

The segment of multimodal application above may now render speech prompts in response to those artists names related to the content of the media file. That is, the segment of multimodal application above may now render speech prompts retrieved from a metadata container in a media file specifically relating to the content of that media file. Dynamic extension of the speech prompts of multimodal applications according to embodiments of the present inventive subject matter makes such multimodal applications more robust and flexible.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the forgoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for dynamically extending the speech prompts of a multimodal application as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of dynamically extending the speech prompts of
a multimodal application, the method comprising:
   receiving, by a prompt generation engine, a media file having a metadata container, wherein the prompt generation engine operates on one or more voice servers;
   retrieving, by the prompt generation engine from the metadata container, a speech prompt related to content stored in the media file for inclusion in the multimodal application, wherein the speech prompt is an audio phrase played by the multimodal application, wherein retrieving a speech prompt includes retrieving a speech artifact having a grammar rule or a pronunciation rule and wherein retrieving a speech prompt includes retrieving a speech artifact having an XML document; and
   modifying, by the prompt generation engine, the multimodal application to include the speech prompt.

2. The method of claim 1 wherein retrieving, by the prompt generation engine, from the metadata container a speech prompt related to content stored in the media file for inclusion in the multimodal application further comprises retrieving a text string prompt for execution by a text to speech engine.

3. The method of claim 1 wherein retrieving, by the prompt generation engine, from the metadata container a speech prompt related to content stored in the media file for inclusion in the multimodal application further comprises retrieving an audio prompt to be played by a multimodal device.

4. The method of claim 1 wherein retrieving, by the prompt generation engine, from the metadata container a speech prompt related to content stored in the media file for inclusion in the multimodal application further comprises identifying a tag for prompts in the metadata container.

5. The method of claim 4 wherein identifying a tag for prompts in the metadata container further comprises identifying a frame for prompts in an ID3 container of an MPEG media file.

6. The method of claim 1 wherein modifying, by the prompt generation engine, the multimodal application to include the speech prompt further comprises updating a prompt document with the retrieved speech prompt.

7. The method of claim 1, further comprising:
modifying the grammar of the speech engine located on the voice server to include at least one of the grammar rule and the pronunciation rule.

8. A voice server that supports multiple modes for interacting with a multimodal device, the voice server comprising:
a computer processor;
a computer memory operatively coupled to the computer processor, the computer memory having disposed within it computer program instructions configured to:
receive a media file having a metadata container;
retrieve, from the metadata container, a speech prompt related to content stored in the media file for inclusion in a multimodal application, wherein the speech prompt is an audio phrase played by the multimodal application;
modify the grammar of the speech engine to include at least one of the grammar rule and the pronunciation rule;
retrieve a speech artifact having an XML, document; and
modify the multimodal application to include the speech prompt.

9. The voice server of claim 8 wherein computer program instructions configured to retrieve, from the metadata container, a speech prompt related to content stored in the media file for inclusion in the multimodal application further comprise computer program instructions configured to retrieve a text string prompt for execution by a text to speech engine.

10. The voice server of claim 8 wherein computer program instructions configured to retrieve, from the metadata container, a speech prompt related to content stored in the media file for inclusion in the multimodal application further comprise computer program instructions configured to retrieve an audio prompt to be played by a multimodal device.

11. The voice server of claim 8 wherein computer program instructions configured to retrieve, from the metadata container, a speech prompt related to content stored in the media file for inclusion in the multimodal application further comprise computer program instructions configured to identify a tag for prompts in the metadata container.

12. The voice server of claim 11 wherein computer program instructions configured to identify a tag for prompts in the metadata container further comprise computer program instructions configured to identify a frame for prompts in an ID3 container of an MPEG media file.

13. The voice server of claim 8 wherein computer program instructions configured to modify the multimodal application to include the speech prompt further comprise computer program instructions configured to update a prompt document with the retrieved speech prompt.

14. The voice server of claim 8 wherein computer program instructions configured to retrieve a speech prompt related to content stored in the media file for inclusion in the multimodal application.

* * * * *